United States Patent
Schmitz et al.

(10) Patent No.: US 6,746,715 B1
(45) Date of Patent: Jun. 8, 2004

(54) METHOD FOR CREATION OF A MULTI-WALLED LIQUID STORAGE VESSEL

(76) Inventors: Wilfried J Schmitz, 10387 Autumn Valley Rd., Jacksonville, FL (US) 32257; James M Hume, 2555 County Rd. 13A South, Elkton, FL (US) 32033

( * ) Notice: Subject to any disclaimer, the term of this patent is extended or adjusted under 35 U.S.C. 154(b) by 40 days.

(21) Appl. No.: 09/607,057

(22) Filed: Jun. 29, 2000

(51) Int. Cl.⁷ .............................. B05D 7/22; B05D 1/36
(52) U.S. Cl. .................. 427/230; 427/258; 427/407.1
(58) Field of Search ..................... 427/230, 236, 427/239, 256, 258, 287, 289, 290, 299, 307, 314, 318, 327, 402, 407.1, 409, 410; 220/453, 460, 461; 405/52; 156/287, 294; 138/109, 143, 141, 149

(56) References Cited

U.S. PATENT DOCUMENTS

| | | | |
|---|---|---|---|
| 3,731,710 A | * 5/1973 | Bauer et al. | ................ 138/109 |
| 4,578,293 A | * 3/1986 | Lusk | ....................... 206/524.6 |
| 4,797,244 A | 1/1989 | Sauer | |
| 4,982,606 A | * 1/1991 | Adamski et al. | ............. 137/387 |
| 5,178,495 A | * 1/1993 | Cameron | ..................... 405/303 |
| 5,261,764 A | * 11/1993 | Walles | ........................ 156/287 |
| 5,368,670 A | * 11/1994 | Kauffman | .................... 156/171 |
| 5,752,616 A | * 5/1998 | Watkinson | ............... 220/567.1 |
| 6,092,556 A | 7/2000 | Adkins | |

* cited by examiner

Primary Examiner—Shrive P. Beck
Assistant Examiner—William Phillip Fletcher, III

(57) ABSTRACT

A method for creating a multiwalled container capable of safely holding a desired liquid. The container may be formed using a mold or form or may be formed on the inside of an existing shell or structure, thereby incorporating the shell or structure as part of the container. The mold or shell is prepared and coated with a first, impermeable polymer layer. An interstitial material is then applied to the first polymer layer and a second impermeable polymer layer is then applied to the permeable, interstitial material. This creates an interstitial space between the two impermeable polymer layers. The process of applying interstitial material and additional polymer layers may be repeated as many times as necessary to achieve the desired number of impermeable walls within the container.

9 Claims, 2 Drawing Sheets

METHOD FOR CREATION OF A MULTI-WALLED LIQUID STORAGE VESSEL

BACKGROUND

1. Field of the Invention

The present invention relates generally to a method for manufacturing a multiple walled vessel that is capable of containing liquid even if the primary, secondary or any number of desired vessel walls is ruptured, up to the final or outermost containment wall.

2. Description of the Prior Art

Multiwalled containers are currently in use in numerous industries in the United States. These containers may serve any number of purposes, from providing insulation or temperature controlling effects, to safely containing harmful or hazardous materials, such as chemicals. Most multi-walled containers require a preformed inner shell to be disposed inside a preformed outer shell, thereby creating an space in between the two shells. Such a process can be costly and does not allow existing containers to be converted to use as multiwalled containers. Similarly, by combining preformed shells, it is difficult, expensive and sometimes impossible to create a multiwalled container in the shape needed for a specific application.

SUMMARY OF THE INVENTION

The present invention provides an improved method for creating a multiwalled vessel. The method may be used to convert an existing shell or structure from a single walled container into a multiwalled container, such as in the case of upgrading or rehabilitating an existing liquid storage vessel, or the method may be used to manufacture a completely new multi-walled container. Where a new container is manufactured, a mold or form may be used to shape the container appropriately for a given application.

Regardless of whether an existing shell or structure or a mold is being used the interior surface or substrate of the shell must be prepared prior to application liner material. Typically, the substrate surface will at least be thoroughly cleaned to remove any undesirable material, such as dirt, oxidation, corrosion or the like, from the surface which may prevent the liner material from properly adhering. Such preparation may include, for example, abrasive blasting or water jetting. Additional steps may be taken to further prepare the substrate surface for the application of liner material. For instance, the surface may be mechanically abraded or chemically etched to provide a desired surface profile in order to maximize adhesion of the liner material.

Once the substrate surface has been adequately cleaned and prepared, a first polymer layer may be applied. This first polymer layer is typically impermeable to the liquid that will be disposed in the container. Similarly, the first polymer layer will have some resistance against deterioration caused by the liquid in the container. The first layer forms a primer, bonding or anchor layer upon which subsequent materials may be applied. The first polymer layer may be formed using any suitable material. This first polymer layer will form the outermost containment wall of the container.

A second, interstitial layer of permeable, non-absorbing material may then be applied to the exposed inner surface of the first polymer layer. This interstitial layer will typically be applied to form voids or pockets throughout so that liquid may travel through the voids and collect at some point within the interstitial material. Additionally, the interstitial material may provide support for successive layers of material which may be applied. Monitoring devices may be located in the interstitial material for detecting the presence of liquid, such as in the case of a leak or rupture.

A third impermeable polymer layer may then be applied to the exposed inner surface of the interstitial layer. This third polymer layer is typically of the same composition as the first polymer layer, but may be formed from any suitable material. The third layer will form the interior of the container and will also form the primary containment wall. By forming the third layer over the second, interstitial layer, an interstitial space is formed between the first layer and the third layer, through which liquid may run should the third layer crack or rupture.

The present invention is particularly useful for restoring, repairing or rehabilitating existing liquid storage vessels and containers. The method provides a new and improved, multi-walled interior to the existing container, so that it can be either put back into full use or easily converted to use with a new or different liquid. In this way the useful life of the container may be significantly extended at a reduced cost.

Although the procedure described forms a double walled vessel or container, it should be understood that any number of additional layers may be included, depending on the specific application for which the container will be used.

DETAILED DESCRIPTION OF THE PREFERRED EMBODIMENTS

Figure 1:
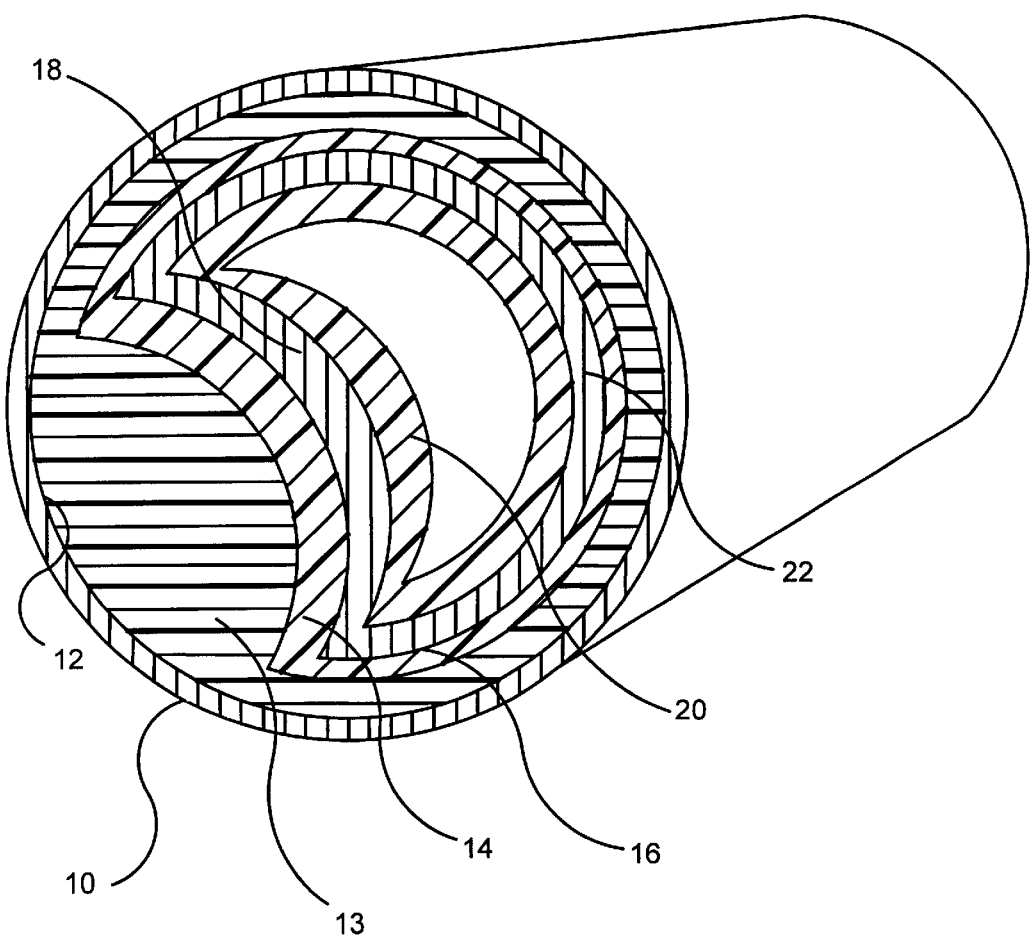
FIG. 1 shows a cross sectional view of a container formed using the method of the present invention.
Figure 2:
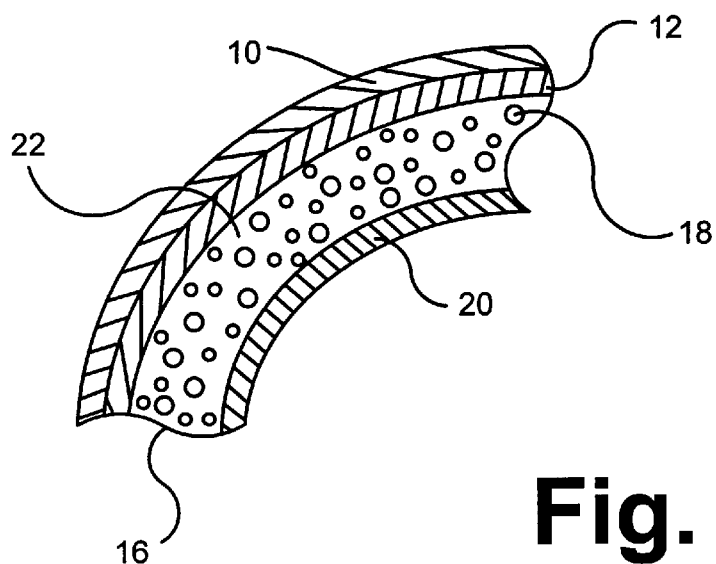
FIG. 2 is an enlarged portion of FIG. 1.
Figure 3:
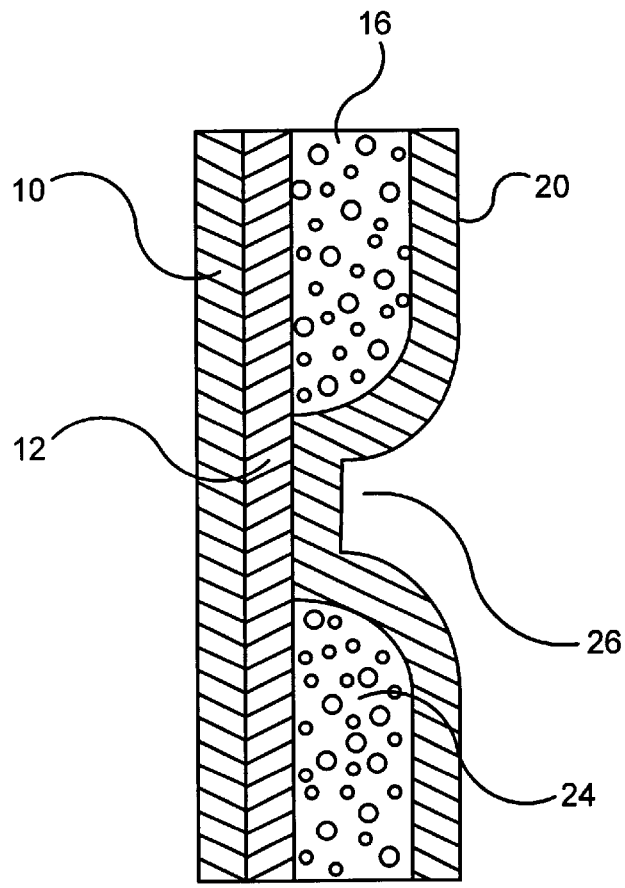
FIG. 3 is a cross sectional view showing an enlarged segment of a compartmentalized container.

FIG. 1 shows a cross-sectional view of a container of the present invention. A shell or structure 10 is provided which may be converted or rehabilitated to include multiple liquid containment walls in accordance with the method herein described. The shell 10 may be formed from any suitable material, such as concrete, metal or plastic. The interior surface 12 of the shell is prepared using any conventional techniques for cleaning and removing debris, contaminants, oxidation, corrosion and the like. For instance, abrasive blasting or water jetting may be used to remove undesirable materials from the inner surface of the shell. Once the interior surface 12 of the shell has been cleaned, it may further be treated in order to create a more optimal adhesion surface for subsequent application of the liner materials. The surface 10 may be, for instance, mechanically abraded or chemically etched to produce the desired surface profile. The specific surface preparation treatment required will depend on the particular type of liner materials used. For instance, certain materials can be applied directly to a wet surface, while others require the surface to be dried prior to application. Similarly, certain materials may not require the surface to be etched or abraded. Depending on the specific nature of the interior surface 12 of the shell 10, it may be desirable to apply an anchor or primer coating 13 to increase the bonding strength between the shell and the additional layers of the container.

Once the interior surface 12 of the structure 10 has been prepared, a first polymer layer, outer containment coating layer 14 may be applied to the interior surface 12. The first polymer layer 14 is an impermeable, liquid resistant layer which forms an outer boundary for preventing escape or spillage of any liquid into the environment during use of the container. Preferably, and depending on the nature of the material used, the first polymer layer may be applied using a conventional compressed air spraying system. Alternatively, the first polymer layer 14 may be applied using any suitable method and may be applied to any suitable thickness, according to the requirements of the specific application. The first polymer layer 14 may be formed from any suitable material that will prevent the leakage of liquid from inside the container and that will be resistant to degradation from the liquid in the container. Preferably, the first polymer layer will be formed from epoxy, urethane or polyurea.

After application of the first polymer layer 14, a second, interstitial layer 16 may be applied to the exposed surface of the first polymer layer 14. The interstitial layer 16 is a permeable, non-absorbing layer of material which preferably has a plurality of air spaces, pockets, or channels 18 throughout which allow any liquid that contacts the interstitial layer 16 to gravity flow to the lowest point in the layer. The interstitial layer may also provide a structural or supporting base for additional layers which may be disposed thereon. The interstitial layer 16 may be formed of any suitable material, but is preferably a polyolefin, polyester, kevlar or open celled foam. The interstitial layer 16 may be applied using any conventional method, such as compressed air spraying. Preferably, the interstitial layer is applied before the first polymer layer has completely cured, as this tends to create a stronger bond between the interstitial layer and the first polymer layer.

Suitable monitoring equipment, such as mechanical or electrical monitors, may be disposed in the interstitial layer 16 for monitoring leaks or ruptures in the various layers of the multi-walled container. The monitoring equipment is typically located near the lowest point in the container, as any liquid, if leaked or spilled, will travel through the permeable interstitial layer and accumulate at such a point.

Following application of the interstitial layer 16, a barrier or inner containment layer 20 may be applied to the exposed surface of the interstitial layer. The barrier layer is a non-permeable liquid resistant layer that is typically in direct contact with the liquid contained in the vessel. By applying the barrier layer material to the exposed surface of the interstitial layer, an interstitial space 22 is formed between the first polymer layer 14 and the barrier layer 20. The barrier layer 20 may be formed of any suitable material. Typically, the barrier layer and the primer layer are formed from the same material and may be applied in the same manner, although, the barrier layer may be applied using any conventional technique.

In some applications, it may be desirable to compartmentalize or segregate sections of the interstitial space 22. Such compartmentalization may help reduce the amount of liquid lost in the event of a leak or spill, may make detection of a leak or spill quicker and easier and may reduce the costs of repair in the event of a leak or rupture. In a preferred embodiment, a compartmentalized interstitial space 24 may be formed by leaving gaps or bands 26 formed by not applying interstitial material in certain sections. When the barrier layer 20 is then applied, the areas devoid of interstitial material essentially form a seal directly between the primer layer 14 and the barrier layer 20, thereby preventing movement of liquid that may accumulate in the interstitial space.

Certain additives or additional components may be included in the barrier layer to perform certain application specific functions. For instance, a biocidal agent may be included in the barrier layer to prevent or inhibit algae growth inside the container. A material capable of blocking ultra violet light may be incorporated to prevent exposure of the liquid in the tank to UV light. Any number of these additives may be included in the barrier layer to form a material that is suitable for a given application.

Similarly, reinforcing material may likewise be incorporated into both the primer layer or the barrier layer to increase both the strength and rigidity of these layers. For instance, mineral, metal or plasticized fibers, rods or flakes may be distributed throughout the layers, either randomly or as a woven mesh material. Preferably, such materials are completely encapsulated within the layers.

In some environments, it may be desirable to incorporate a thermal insulation material into the container. Such an insulation material may be incorporated at any point during the formation of the liner. Preferably, any insulation material would be applied to the primer layer, immediately prior to the application of the interstitial layer.

It should be understood that the present method may be used to create a vessel or container having any number of walls incorporated therein. This is possible by applying additional layers of interstitial material and barrier layer material.

The method of the present invention may be used, not only to repair or rehabilitate an existing vessel, but may also be used to manufacture new multi-walled containers. Where a new container is desired, a mold is used to form the container in the proper shape. Preferably, the mold will comprise easily separable sections which can be dismantled after the various layers which comprise the container have adequately cured. The inner surface of the mold may be prepared as for an existing shell or structure.

While certain features and embodiments of the invention have been described in detail herein, it will be understood that the invention includes all improvements, modifications and enhancements within the scope and spirit of the following claims.

We claim:

1. A method for manufacturing a multiwalled container for containing liquid comprising the steps of:
   a. providing a shell having an inner surface and an outer surface;
   b. applying a primer layer to said inner surface;
   c. applying a first polymer layer to said primer layer to form a first, outer wall;
   d. applying a first, permeable, non-absorbing material to said first, outer wall to form an interstitial space, wherein said interstitial space is compartmentalized by leaving a gap between adjacent sections of said first, permeable, non-absorbing material to allow for quicker and easier detection of spills or leaks;
   e. applying a second polymer layer to said first, permeable, non-absorbing material such that upon application of said second polymer layer the first and second polymer layers are in direct contact with each other in the gaps between sections of the first, permeable, non-absorbing material, the second polymer layer forming a first inner wall.

2. The method of claim 1, including the step of positioning a monitoring means in the interstitial space, said monitoring means being capable of alerting a user of the container of leaks or ruptures in said inner surface.

3. The method of claim 2, wherein said monitoring means comprises an electrical monitor.

4. The method of claim 2, wherein said monitoring means comprises a mechanical monitor.

5. The method of claim 1, said second polymer layer containing a specific additive to alter the characteristics of the polymer, wherein said specific additive is a biocidal agent to deter algae growth inside the container.

6. The method of claim 1, including the steps of:

cleaning said shell to create a suitable substrate for application of the primer layer;

applying treatment to said inner surface of said shell to create an improved surface profile;

after applying the primer layer to said inner surface and prior to applying the first polymer layer, applying a thermal insulation layer.

7. The method of claim 6, said second polymer layer containing a specific additive to alter the characteristics of the polymer, wherein said specific additive is a biocidal agent to deter algae growth inside the container.

8. A method for manufacturing a multiwalled container for containing a liquid comprising the steps of:

a. providing a shell having an inner surface and an outer surface;

b. cleaning said shell to create a suitable substrate for application of a primer layer;

c. applying treatment to said inner surface of said shell to create an improved surface profile;

d. applying a primer to said inner surface;

e. applying a thermal insulation layer to said primer;

f. applying a first polymer layer to said insulation layer to form a first outer wall;

g. applying a first, permeable, non-absorbing material to said first, outer wall to form an interstitial space wherein said interstitial space is compartmentalized by leaving a gap between adjacent sections of said first, permeable, non-absorbing material to allow for quicker and easier detection of spills or leaks;

h. applying a second polymer layer to said first, permeable, non-absorbing material which is in direct contact with the first polymer layer in gaps between the sections of the first, permeable, non-absorbing material, to form a first inner wall.

9. The method of claim 8, said second polymer layer containing a specific additive to alter the characteristics of the polymer, wherein said specific additive is a material capable of blocking ultraviolet light to prevent exposure of the liquid in the container to ultraviolet light.

* * * * *